United States Patent [19]
Hansen

[11] 3,710,213
[45] Jan. 9, 1973

[54] PULSE RATE CONTROL MOTOR SPEED CONTROL SYSTEM WITH FEEDBACK

[75] Inventor: James E. Hansen, Oak Creek, Wis.

[73] Assignee: Cutter-Hammer, Inc., Milwaukee, Wis.

[22] Filed: Feb. 22, 1971

[21] Appl. No.: 117,399

[52] U.S. Cl. .............................................. 318/331
[51] Int. Cl. ............................................. H02p 5/16
[58] Field of Search ....... 318/327, 331, 332, 341, 345

[56] References Cited

UNITED STATES PATENTS

| | | | |
|---|---|---|---|
| 3,586,948 | 6/1971 | Broome | 318/341 |
| 3,177,417 | 4/1965 | Wright | 318/345 |
| 3,177,418 | 4/1965 | Meng | 318/345 |
| 3,553,556 | 1/1971 | Dosch | 318/345 |
| 3,581,176 | 5/1971 | Bigg | 318/327 |
| 3,586,947 | 6/1971 | Ilk | 318/331 |

*Primary Examiner*—Bernard A. Gilheany
*Assistant Examiner*—Thomas Langer
*Attorney*—Hugh R. Rather and William A. Autio

[57] ABSTRACT

A control system of the feedback type especially adapted for controlling the speed of a D.C. motor such as a permanent magnet field motor or a shunt wound motor. A solid state pulse generator provides constant width D.C. pulses for controlling the "on" time of the motor. A feedback signal from the motor is applied to the solid state pulse generator to control the "off" time of the motor to afford pulse rate control for speed regulation.

10 Claims, 3 Drawing Figures

3,710,213

PULSE RATE CONTROL MOTOR SPEED CONTROL SYSTEM WITH FEEDBACK

BACKGROUND OF THE INVENTION

Speed control of a D.C. motor from a continuous D.C. supply has been achieved in a number of ways.

One way has been to place a rheostat in series with the motor and supply to adjustably limit the current to the motor. This has the disadvantage that in any application requiring very much power, the heat dissipation and battery power waste are excessive. Also, regulation is inadequate since the resistance limits the available current under load conditions.

Another way has been to provide tapped voltage points on the supply to which the motor can be selectively connected for discrete speed changes. Disadvantages of this include complex contactor systems requirements having limited life and non-continuous speed change.

A further method has been the use of a chopper switch in series with the motor and supply for turning the motor current on and off at a fast rate to control the speed by varying the "on" versus "off" ratio, and thereby changing the average current through the motor armature. Mechanical contactors would not be suitable since they would not last long enough under these conditions.

It has been known to use solid state devices in place of such mechanical chopper switch such as a transistor or an SCR for speed control of electric motors such as D.C. motors of the series, shunt or permanent magnet types. Both pulse rate and pulse width control have been known. Pulse width control maintains a constant rate and varies the "on" time. Pulse rate control maintains a constant width "on" pulse and varies the "off" time or time between pulses. The "on" versus "off" ratio determines the average motor current that controls the speed.

The present invention relates to the latter type of control, that is, pulse rate control, and to improvements therein over prior known systems.

SUMMARY OF THE INVENTION

This invention relates to a pulse rate control motor speed control system with feedback for speed regulation that is much less complicated, less expensive and works better than other known systems of that type.

An object of the invention is to provide an improved motor speed control system.

A more specific object of the invention is to provide an improved pulse rate control system that is controllable by a feedback voltage signal from the load device.

Another specific object of the invention is to provide an improved pulse rate motor speed control system for a D.C. motor whereby a feedback signal controls the space between constant width pulses.

Another specific object of the invention is to provide an improved D.C. chopper type motor speed control system having feedback for speed regulation that is simple and economical in construction and efficient in operation.

Another specific object of the invention is to incorporate a feedback circuit into a pulse rate generator to provide excellent speed/load regulation which involves the addition of very few components.

Other objects and advantages of the invention will hereinafter appear.

DESCRIPTION OF THE PREFERRED EMBODIMENT

Figure 1:
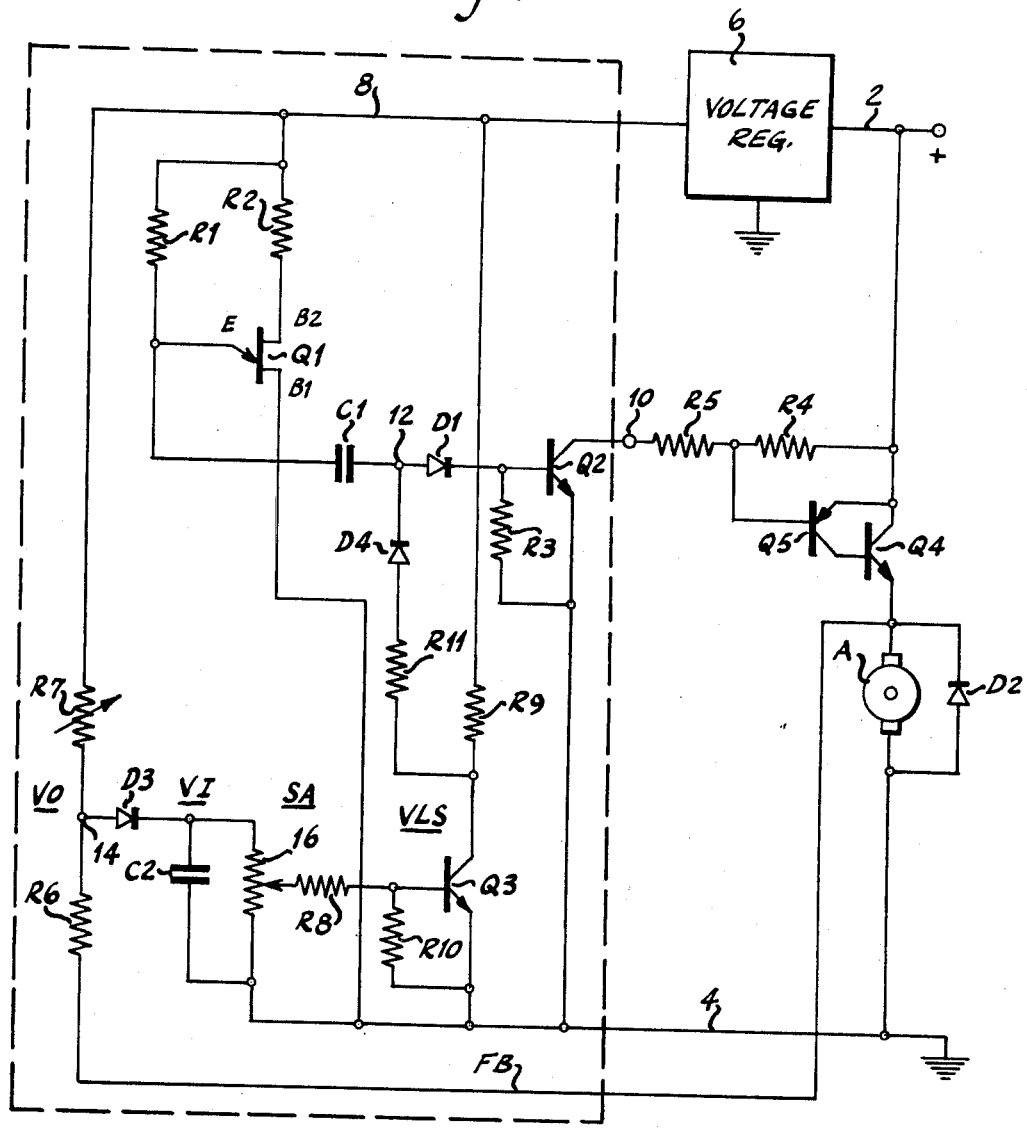
FIG. 1 shows a pulse rate control motor speed control system with feedback constructed in accordance with the invention.

Referring to FIG. 1, there is shown a pulse rate control motor speed control system with feedback for speed regulation. This system comprises a motor power circuit at the right-hand portion of the circuit diagram and a pulse generator circuit enclosed within broken lines at the left-hand portion of the diagram.

The motor power circuit is supplied from a D.C. source such as a portable battery or the like represented by the positive and ground symbols. The positive side of this source is connected to conductor 2 and the negative or ground side thereof is connected to conductor 4.

The pulse generator circuit is supplied from conductors 2 and 4 through the interposition of a voltage regulator or voltage reducer. For this purpose, conductor 2 is connected through voltage regulator 6 to conductor 8 and the pulse generator circuit is connected between conductors 8 and 4.

This voltage regulator 6 may be a well known device for preventing the motor from disturbing the pulse generator supply voltage such as a zener diode circuit or the like. It may also include known voltage dropping or reducing means such as a resistor in the event the motor supply voltage is required to be of higher value than the pulse generator supply voltage.

The pulse generator circuit comprises a unijunction transistor Q1 circuit for generating constant width control pulses for controlling an N-P-N transistor Q2 switch that supplies generated pulses to an output terminal 10. This pulse generator circuit is controlled by a voltage level switching transistor Q3 circuit VLS that controls the space between the constant width control pulses. This transistor Q3 circuit is controlled by a feedback circuit FB through a voltage offset circuit VO, a voltage integrator circuit VI and a speed adjust circuit SA. These component circuits are hereinafter described in more detail.

The motor power circuit comprises a power switching transistor Q4 circuit for connecting power from conductors 2 and 4 to armature A of the motor under the control of the pulses at output terminal 10. It should be noted that the power switching circuit to the motor could actually take many forms such as SCR choppers, etc., since its purpose is only to follow the pulse generator signal and amplify it to handle motor current.

While a unijunction transistor Q1 circuit has been shown for developing constant width pulses, it will be apparent that equivalent negative resistance devices could be used in place thereof, or an equivalent controlled oscillator circuit could be used in place of the circuit shown. This unijunction transistor Q1 has its emitter E connected to the junction between a resistor R1 and a capacitor C1, the other side of resistor R1 being connected to positive D.C. conductor 8 and the other side of capacitor C1 being connected to a junction 12 hereinafter referred to. Interbase voltage to the unijunction transistor is supplied from constant D.C. voltage conductor 8 through an operation-stabilizing resistor R2 to its base B2 whereas its base B1 is connected directly to grounded conductor 4. As will be apparent, this unijunction transistor circuit operates as a relaxation oscillator; that is, capacitor C1 charges and alternately discharges through the emitter-base B1 circuit each time that the capacitor C1 voltage reaches the emitter peak point value.

The unijunction transistor and its RC circuit determine the "on" pulse duration of the motor. When capacitor C1 is charging, current flows from conductor 8 through resistor R1 to capacitor C1 and through junction 12, diode D1 and the base-emitter circuit of switching transistor Q2 to conductor 4. This current turns transistor Q2 on causing the voltage at output terminal 10 to switch from a positive voltage value substantially equal to that on conductor 2 to a value near ground potential. This shift in voltage is the "on" signal for the motor as hereinafter described.

In the circuit of switching transistor Q2, resistor R3 connected between the base and emitter is a by-pass resistor and diode D1 is a blocking diode that isolates transistor Q2 from junction 10 during the discharge time of capacitor C1 and, therefore, prevents transistor Q2 from affecting such discharge time.

The motor power circuit comprises a pair of transistors Q4 and Q5 connected in a high gain arrangement. For this purpose, the collector of N-P-N transistor Q4 is connected to positive conductor 2 and the emitter thereof is connected through motor armature A to conductor 4. A P-N-P transistor Q5 has its emitter connected to the collector of transistor Q4 and has its collector connected to the base of transistor Q4. The base of transistor Q5 is connected to the junction between a pair of series resistors R4 and R5 that are connected from positive conductor 2 to output terminal 10.

It will be apparent that when transistor Q2 conducts during the charging periods of capacitor C1 as aforesaid and shifts the voltage at output terminal 10 to near ground potential, it is desired that during this time the output switch connected between the battery and the motor be "on." In the case of the output circuit illustrated, the base of the output switch driver transistor Q5 is biased on through resistor R5. The high gain common emitter-common collector pair Q5 and Q4 thus conducts current to the motor. R4 is a base to emitter bypass resistor for transistor Q5.

A "flyback" or "free-wheeling" diode D2 is connected across the motor armature to dissipate the induced motor energy quickly when transistor Q4 disconnects power from the motor.

Only armature A of the motor has been shown. This motor is preferably of the type having a permanent magnet field or a shunt field or the like having a substantially strong field because such motor has a "-flyback" time that is usually much shorter than for series type motors due to less stored field collapse and provides a particularly good CEMF during the motor "off" periods to provide a good feedback signal, although conceivably other types of motors and loads might be used with this circuit.

The feedback circuit comprises a feedback signal conductor FB connected from the positive side of the armature at the junction between transistor Q4 and the armature through a resistor R6 to a junction 14 at a voltage offset circuit VO. This voltage offset circuit comprises an adjustable resistor R7 connected from junction 14 to positive D.C. conductor 8. This voltage offset circuit affords setting of the speed to a lower value as hereinafter more fully described.

Junction 14 is connected through a reverse blocking diode D3 to a voltage integrating circuit VI. This voltage integrating circuit comprises a capacitor C2 connected from diode D3 to grounded conductor 4. A speed adjust circuit SA is connected to this voltage integrating circuit. This speed adjust circuit comprises a potentiometer 16 connected across capacitor C2 with its movable tap being connected through a current limiting resistor R8 to the base of a high gain N-P-N transistor Q3 in a voltage level switching circuit VLS. The emitter of this transistor is connected directly to grounded conductor 4 and the collector thereof is connected through a load resistor R9 to positive D.C. conductor 8. A bypass resistor R10 is connected from the base to the emitter of transistor Q3. An output circuit extends from the collector of transistor Q3 through a current limiting resistor R11 and a reverse blocking diode D4 to the aforementioned junction 12.

The operation of the system will now be described. As hereinbefore described, the unijunction transistor in conjunction with the time constant of resistor R1 and capacitor C1 determines the "on" period of the motor by turning transistor Q2 on while capacitor C1 is charging, this time being determined as is best suited to specific motor behavior. This transistor Q2 functions as a high gain switch to form a square wave pulse at the generator output terminal 10 and to provide current handling capability to drive the motor power switch circuit.

The feedback portion of the pulse generator circuit determines the "off" period of the motor. By controlling this "off" time between the fixed width "on" pulses, the duty cycle and thus the motor speed is controlled. This feedback portion of the circuit is the key to the performance of the system.

To aid in understanding the operation, let it first be seen what would happen if transistor Q3 is kept in the "off" state where its collector is effectively open. The circuit from positive voltage through resistors R9 and R11 and diode D4 would provide a continuous positive bias to junction 12 in the capacitor C1 charging circuit. This would result in a very rapid pulse rate, thus a high duty cycle ("on" versus "off" time) of the output pulse train, or even a continuous "on" state. That is, capacitor C1 would charge normally to provide a constant width "on" pulse for the motor and upon reaching emitter peak voltage would discharge quickly to allow the unijunction transistor to recover, whereupon capacitor C1 would start recharging to provide another motor "on" pulse very quickly for a high duty cycle.

Let it next be seen what would happen if transistor Q3 is kept in the "on" state where resistor R11 is effectively connected to ground potential. Under this condition, capacitor C1 would charge normally to provide a constant width "on" pulse for the motor and upon reaching emitter peak voltage would discharge very slowly, holding transistor Q2 off for a long period of time, resulting in a very low duty cycle.

From this it will be apparent that transistor Q3 can be used to vary the duty cycle from very high when it is kept turned "off" to very low when it is kept turned "on" as hereinafter more fully described.

Figure 2:
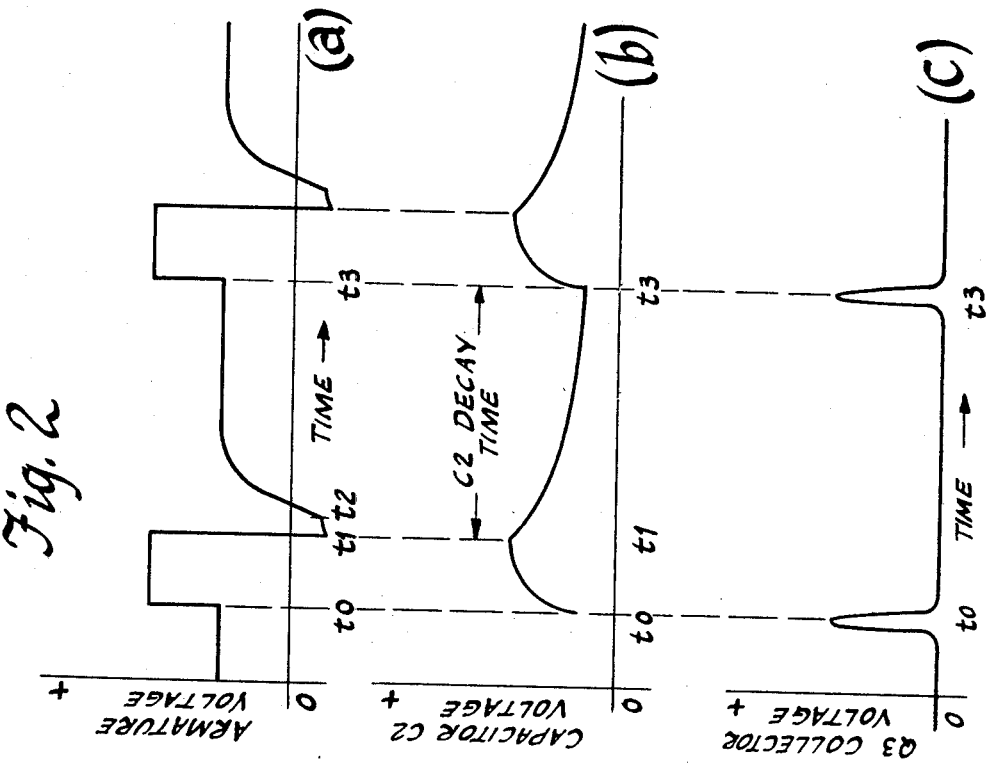
FIG. 2 is a graph showing operating characteristics of the system of FIG. 1.

Referring to FIG. 1, it will be apparent that for purposes of description of operation, a convenient starting point is where capacitor C1 starts to charge. This is shown as time "t0" in FIG. 2, which includes three curves (a), (b) and (c) showing the armature voltage, the capacitor C2 feedback voltage, and the transistor Q3 collector voltage, respectively.

During the time that capacitor C1 charges, current flows through the base-emitter circuit of transistor Q2 to turn this transistor on as hereinbefore described. As a result, transistors Q5 and Q4 are turned on to provide an "on" pulse to the motor armature as shown by the curve in FIG. 2(a) between times "t0" and "t1". This "on" pulse causes the motor to start rotating. At the end of this "on" pulse, the interruption of the applied current to the motor causes the motor inductance to generate reverse EMF (electro-motive force) voltage which is clamped by "flyback" or "freewheeling" diode D2, this occurring between times "t1" and "t2". This time is typically much shorter than the "on" time of the applied pulse of time "t0" to "t1," and is a function of the stored energy in the armature inductance. At the end of this time, at time "t2," the motor begins to generate a counter EMF due to its armature windings cutting through the motor field flux. This generated voltage is directly proportional to velocity, or in effect, RPM, and is thus used as the feedback signal to control the motor speed by affecting the "off" time of the pulse generator.

When the motor is pulsed "on" during time "t0" to "t1," capacitor C2 charges rapidly and this is illustrated by the curve in FIG. 2(b) from "t0" to "t1." An adjustable portion of the voltage on capacitor C2 is applied from the movable tap of potentiometer 16 through resistor R8 to the base of transistor Q3 to turn this transistor on. As a result, the collector voltage of this transistor shifts from a positive value to near ground potential as shown by the curve in FIG. 2(c) shortly after time "t0."

At time "t1" the voltage on capacitor C1 has reached the emitter peak value to trigger the unijunction transistor into conduction. The voltage on capacitor C1 is positive on its left side and near ground potential on its right side, offset from ground potential by the voltage drops on diode D1 and the base-emitter junction of transistor Q2. Triggering of the unijunction transistor effectively connects the left side of capacitor C1 to conductor 4 that is at ground potential, causing the left side of capacitor C1 to drop from positive voltage to near ground potential. Since this capacitor cannot discharge instantaneously, its right side potential drops from near ground potential to a negative voltage.

This negative voltage at junction 12 reverse biases the base-emitter circuit of transistor Q2 to turn it off to terminate the motor "on" pulse at time "t1" in FIG. 2(a).

As a result of the termination of the motor energizing pulse, the feedback signal is reduced so that capacitor C2 starts discharging as shown by the curve in FIG. 2(b) starting at time "t1." The rate at which the curve in FIG. 2(b) decays for a given constant value of resistance in circuit with capacitor C2 depends on the value of the motor CEMF. If the motor CEMF is high, the capacitor C2 voltage decays slowly. If the motor CEMF is low, the capacitor C2 voltage decays faster.

For this purpose at time "t1," when the "on" pulse terminates, capacitor C2 begins to discharge through potentiometer 16 and resistor R8 to the base-emitter junction of transistor Q3. At this time, the voltage across capacitor C2 is above the voltage of junction 14 since the CEMF is below the "on" voltage close to which capacitor C2 has been charged. Therefore, the discharge current rate is only RC controlled. This rate is relatively fast and short. However, when the capacitor C2 voltage has discharged to a level where diode D3 begins to conduct due to the CEMF contribution at junction 14, then the rate of decrease of the capacitor C2 voltage decreases. This is because the capacitor C2 discharge current decreases by the component of current through diode D3. When diode D3 begins to conduct the voltage at junction 14 decreases due to the drop in resistor R6. Thus, the capacitor C2 voltage falls with the voltage at junction 14 at a slow rate. The net effect is a leveling off of the capacitor voltage into a shallow ramp shown in FIG. 2(b) which exists right near the switching (turn-off) threshold of transistor Q3 that occurs at time "t3." Diode D3 actually begins to conduct shortly after time "t1." Thus, the effect is similar to the well known pedestal-ramp effect. The net result is a very high gain since any small change in load CEMF shifts the time "t3" point significantly to vary the time between "on" pulses.

When the capacitor C2 voltage decreases to a point that is insufficient to maintain transistor Q3 conducting, this transistor turns off. This occurs at time "t3" as shown in FIG. 2(b), or very shortly before time "t3" as shown by the transistor Q3 collector voltage rising to a positive value in FIG. 2(c).

This shift in the transistor Q3 collector voltage from near ground potential to a positive value allows capacitor C1 to discharge quickly thereby enabling unijunction transistor Q1 to recover its non-conducting state. As a result, charging current again starts flowing into capacitor C1 and through the base-emitter circuit of transistor Q2 to turn this transistor on. This causes the application of another motor "on" pulse as shown in FIG. 2(a).

This motor energizing pulse causes transistor Q3 to be turned back on very soon so that transistor Q3 is turned off only for a moment as shown in FIG. 2(c) to cause discharge of capacitor C1 sooner than it would discharge otherwise. For this purpose, the motor "on" pulse propagates across the feedback loop to recharge capacitor C2 to a high value whereby the voltage applied from the movable slider of potentiometer 16 to the base of transistor Q3 turns this transistor back "on." The RC time constant of resistor R6 and capacitor C2 is shorter than the RC time constant of resistors 16 and R8 and capacitor C2. Thus, this capacitor is charged by the feedback signal through resistor R6 during the motor "on" pulse faster than it is discharged through potentiometer 16 and resistor R8 during the "off" time as shown in FIG. 2(b). Again, however, the decay time is also a function of the feedback signal as well as the time constant of capacitor C2 and the resistors to the right of it. In this connection, it may be noted that transistor Q3 preferably should have a very high gain and two N-P-N transistors connected similarly to transistors Q4–Q5 (only in a common collector pair) in the motor circuit could be used in place of transistor Q3 to increase the gain. The use of a high gain voltage level switching transistor provides a sharp threshold for the time "t3" point in FIG. 2(b). This provides excellent speed vs. load regulation by tending to keep the CEMF at a fixed level and consequently to keep the motor speed constant.

The motor speed may be adjusted or selected at potentiometer 16. By moving the tap up, the base signal is increased to keep transistor Q3 on longer thereby to reduce the motor speed. Moving this tap down reduces the base voltage of transistor Q3, below its turn-on level thereby allowing the feedback to call for another motor "on" pulse sooner to increase the motor speed.

Variable resistor R7 is provided to afford a lower motor speed. A positive voltage is applied through this resistor to junction 14 and then through diode D3 to capacitor C2. This voltage may be used to offset the feedback voltage at very low CEMF voltages to overcome or compensate for the voltage drops in diode D3 and the base-emitter junction of transistor Q3. This resistor R7 may be adjusted to provide a plus offset to the feedback voltage whereby to extend the low speed control capabilities of the system. It can be seen that an added current at junction 14 shifts the CEMF voltage up slightly and thereby slows down the decay or discharge of capacitor C2 as does the CEMF signal from the motor and thereby extends its decay time shown in FIG. 2(b). As a result, fewer motor "on" pulses are applied to afford slower speed.

Diode D3 prevents capacitor C2 from discharging back toward junction 14 so as not to disturb the discharge pedestal immediately after time "t1."

The system would operate without some of the elements shown in FIG. 1 such as diodes D1, D3 and D4, and resistors R3, R7 and R10, but these elements are included because they perform the following functions that make it work better:

Diode D1 eliminates any reverse base-emitter voltage clamping of transistor Q2 when the unijunction transistor is triggered to discharge capacitor C1 and thereby prevents the transistor Q2 circuit from affecting the capacitor discharge time.

Diode D4 allows all of the charging current of capacitor C1 to go to the base of transistor Q2 rather than having part of it diverted through resistor R11 and transistor Q3 to ground.

Resistors R3 and R10 are base to emitter bypass resistors that are typically used in switching circuits to improve transistor switching speed (turn off) and high temperature leakage effects.

Resistor R7 provides a plus offset to the feedback signal (motor CEMF) and permits extending the low speed control capabilities. This offset compensates for the offset voltages of diode D3 and the base-emitter of transistor Q3 (the latter may be a pair of transistors, thus having two series voltage drops).

Figure 3:
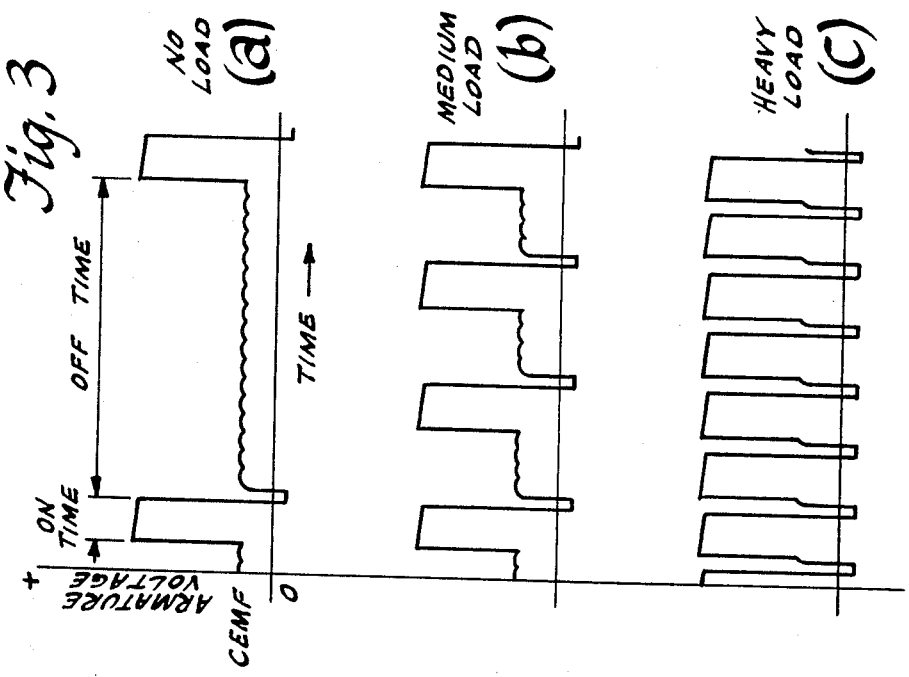
FIG. 3 is a graph showing the output voltage under different load conditions.

FIG. 3 shows how the pulse frequency increases as the motor is loaded. FIG. 3(a) shows the motor pulses for a no load condition, FIG. 3(b) shows the motor pulses for a medium load condition, and FIG. 3(c) shows the motor pulses for a heavy load condition. The feedback effect is based on the fact that if the motor is loaded down tending to reduce the speed, the CEMF voltage will tend to decrease. This will cause the decay time of capacitor C2 to decrease. Since the junction 14 voltage level has decreased, the point in the decay curve of capacitor C2 where diode D3 begins to conduct is reduced. Thus, the capacitor voltage decays down to the threshold level faster. Consequently, transistor Q3 will be turned off sooner, reducing the "off" time of the pulse generator wave. The duty cycle of the motor is thus increased, correspondingly increasing the power supplied to the motor and providing speed compensation for the load.

If instead the load is decreased allowing the motor speed to increase, the CEMF voltage will tend to increase. This will cause the decay time of capacitor C2 to increase due to diode D3 conducting earlier. Consequently, transistor Q3 will be turned off later, increasing the "off" time of the pulse generator wave. The duty cycle of the motor is decreased, thus correspondingly decreasing the power supplied to the motor to decrease the speed.

While the system hereinbefore described is effectively adapted to fulfill the objects stated, it is to be understood that the invention is not intended to be confined to the particular preferred embodiment of pulse rate control motor speed control system with feedback disclosed, inasmuch as it is susceptible of various modifications without departing from the scope of the appended claims.

I claim:

1. A pulse generating control system incorporating feedback control and comprising:
   a pulse generator circuit for generating constant width output pulses for use as "on" pulses for a motor;
   a motor circuit energized by said output "on" pulses and comprising means providing a feedback signal as a function of operation of said motor circuit;
   and a feedback circuit responsive to said feedback signal for controlling said pulse generator circuit so as to control the time of said output "on" pulses comprising:
   voltage integrating means;
   means operable during the "on" pulses for resetting said voltage integrating means to an initial voltage level from which it will decay at a predetermined rate;
   means for decaying said integrated voltage when each output "on" pulse ends;
   means responsive to the motor CEMF for altering said predetermined rate during the "off" time or time between output "on" pulses;
   and voltage level detecting means responsive to said integrated voltage for controlling said pulse generator circuit to control the space between said constant width output "on" pulses thereby to control the motor speed.

2. The invention defined in claim 1, wherein said voltage level detecting means comprises:
   a solid state switching device responsive to said voltage above a predetermined value for applying a first control signal to cause said pulse generator circuit to delay generation of the next pulse, and being responsive to said voltage below said predetermined value for applying a second control signal to cause said pulse generator circuit to start generating the next pulse.

3. The invention defined in claim 1, wherein said voltage level detecting means comprises:
adjustable means for selecting a variable portion of said integrated voltage for application to said voltage level detecting means thereby to select the amount of energization of the load.

4. The invention defined in claim 3, wherein said feedback circuit also comprises:
means for applying an adjustable offset voltage to said voltage integrating means thereby to extend the low energization capabilities of the system.

5. The invention defined in claim 1, wherein said pulse generator circuit comprises:
a solid state relaxation oscillator having a negative resistance solid state element and an RC circuit controlled thereby;
and a high gain solid state switch responsive to current flow in said RC circuit to provide an output pulse and responsive to operation of said negative resistance solid state element for terminating said output pulse.

6. The invention defined in claim 5, wherein said voltage level detecting means comprises:
a second high gain solid state switch operable when said integrated voltage decreases below said predetermined value for resetting said RC circuit to a state productive of another output pulse.

7. The invention defined in claim 5, wherein said voltage level detecting means comprises:
a second high gain solid state switch connected to said RC circuit and responsive to said integrated voltage falling below said predetermined value for causing recovery of the pulse generating condition;
and a blocking diode in said connecting preventing diversion of current from the first mentioned high gain solid state switch.

8. A pulse time controlled motor speed control system controlled by feedback comprising:
a pulse generating circuit for generating constant width output pulses for use as "on" pulses for a motor;
a motor circuit including means for applying said output pulses to the armature winding of a D.C. motor;
a connection to the motor armature for obtaining a motor counter EMF signal;
and a feedback circuit operable by said counter EMF signal for controlling said pulse generating circuit to adjust the space between said output "on" pulses whereby to regulate the motor speed to a preselected value comprising:
a voltage integrator;
means operable during the "on" pulses for setting said voltage integrator to an initial voltage level from which it will decay at a predetermined rate;
means responsive to said counter EMF for altering said predetermined rate during the "off" time between "on" pulses;
means for providing a control voltage as a function of said decaying voltage level;
a speed setter for tapping an adjustable portion of said control voltage;
and voltage level responsive switching means operable by said selected portion of said control voltage for controlling said pulse generator circuit to regulate the space between said output "on" pulses so as to maintain the motor speed at the value selected at said speed setter.

9. The invention defined in claim 8, wherein:
said means operable during the "on" pulses for setting said voltage integrator to an initial voltage level from which it will decay at a predetermined rate comprises a relatively short time constant circuit for integrating said "on" pulses;
and said means for providing a control voltage as a function of said decaying voltage level comprises a relatively longer time constant circuit for decaying the integrated voltage whose decay rate is modified by said motor counter EMF;
said predetermined rate providing a pedestal voltage and said alteration therein producing a ramp on said pedestal voltage to provide a high gain whereby small changes in the ramp slope provide large changes in time between "on" pulses;
and a blocking diode in said short time constant circuit for preventing current flow back toward the motor armature.

10. The invention defined in claim 9, together with:
means connected to said short time constant circuit for offsetting the counter EMF voltage in a direction to extend the low speed range of the motor.

* * * * *